United States Patent [19]
Stearns

[11] Patent Number: 5,133,882
[45] Date of Patent: Jul. 28, 1992

[54] BARGE MOUNTED OIL RECOVERY AND RECYCLE SYSTEM

[75] Inventor: Donald M. Stearns, Cocoa, Fla.

[73] Assignee: PEC Research, Inc., Titusville, Fla.

[21] Appl. No.: 588,268

[22] Filed: Sep. 26, 1990

[51] Int. Cl.$^5$ .............................................. C02F 1/40
[52] U.S. Cl. ................................ 210/776; 210/703; 210/706; 210/221.1; 210/242.1; 210/923
[58] Field of Search ............ 210/776, 662, 242.3, 210/242.4, 182, 187, 703, 221.1, 221.2, 513, 202, 923, 747, 242.1, 197, 96.1, 170, 177, 777

[56] References Cited

U.S. PATENT DOCUMENTS

| | | | |
|---|---|---|---|
| 3,578,171 | 5/1971 | Usher | 210/242.3 |
| 3,630,376 | 12/1971 | Price | 210/242.3 |
| 3,690,464 | 9/1972 | Heinicke | 210/242.3 |
| 3,737,040 | 6/1973 | Brydoy et al. | 210/242.3 |
| 3,752,317 | 8/1973 | Lithen | 210/242.3 |
| 3,754,653 | 8/1973 | Verdin | 210/197 |
| 3,815,751 | 6/1974 | Pavlovic | 210/242.3 |
| 3,862,904 | 1/1975 | Weatherford | 210/243.3 |
| 3,922,225 | 11/1975 | Strain | 210/242.3 |
| 3,929,644 | 12/1975 | Fletcher | 210/242.3 |
| 3,959,136 | 5/1976 | Ayers | 210/776 |
| 3,966,613 | 6/1976 | Kirk et al. | 210/242.3 |
| 3,966,614 | 6/1976 | Ayers | 210/242.3 |
| 3,966,615 | 6/1976 | Petchul et al. | 210/242.1 |
| 4,049,554 | 9/1977 | Ayers | 210/242.3 |
| 4,075,096 | 2/1978 | Kawakami et al. | 210/96.1 |
| 4,105,554 | 8/1978 | Janson | 210/96.1 |
| 4,119,541 | 10/1978 | Makaya | 210/242.1 |
| 4,145,292 | 3/1979 | In'tveld | 210/242.3 |
| 4,178,243 | 12/1979 | Janson | 210/96.1 |
| 4,198,300 | 4/1980 | Williams | 210/170 |
| 4,209,400 | 6/1980 | Mayes | 210/776 |
| 4,308,140 | 12/1981 | Pierson | 210/242.3 |
| 4,348,282 | 9/1982 | Fries et al. | 210/242.3 |
| 4,391,763 | 7/1983 | Le Foll et al. | 210/242.3 |
| 4,394,265 | 7/1983 | van Drimmelen et al. | 210/242.3 |
| 4,399,040 | 8/1983 | Ayers et al. | 210/749 |
| 4,477,348 | 10/1984 | Ayers et al. | 210/242.3 |
| 4,491,518 | 1/1985 | Bemareya et al. | 210/177 |
| 4,515,684 | 5/1985 | Brown | 210/803 |
| 4,889,638 | 12/1989 | Rockford et al. | 210/703 |

FOREIGN PATENT DOCUMENTS 2591128  9/1985  France ................... 210/703

Primary Examiner—Robert A. Dawson
Assistant Examiner—Ana Fortuna
Attorney, Agent, or Firm—Antonelli, Terry Stout & Kraus

[57] ABSTRACT

This invention consists of a method of operation of a Self-Propelled Barge that is capable of supporting six integrated process systems for the continuous recovery of surface and sub-surface Oil or Oil Products spilled into Fresh, Brackish or Sea Water. The six major process systems provided by the invention are as follows: (1) A wave following positioning system that will provide the correct distance below the surface of the Water in order to allow the introduction of a process for the flotation and compaction of surface and sub-surface of Oil by entrained and super saturated dissolved Air. (2) A process system that provides maximum efficiency of flotation and compaction of Oil by providing a recirculated water supply with entrained and super saturated dissolved Air. (3) A process system that provides a Wave following adjustable positioning vacuum collection system for the compacted Oil film on the surface of the Water. (4) A vacuum collection system that combines a vacuum receiver and a separation column to provide both collection and separation in a single process stage. (6) A secondary gravity separation process to further increase the efficiency of the Oil/Water separation. A combined process system to store recovered Oil on board the Barge and to also transfer the recovered Oil to an independent Oil storage bulk carrier.

9 Claims, 15 Drawing Sheets

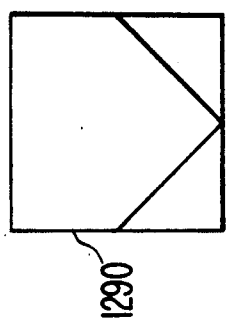
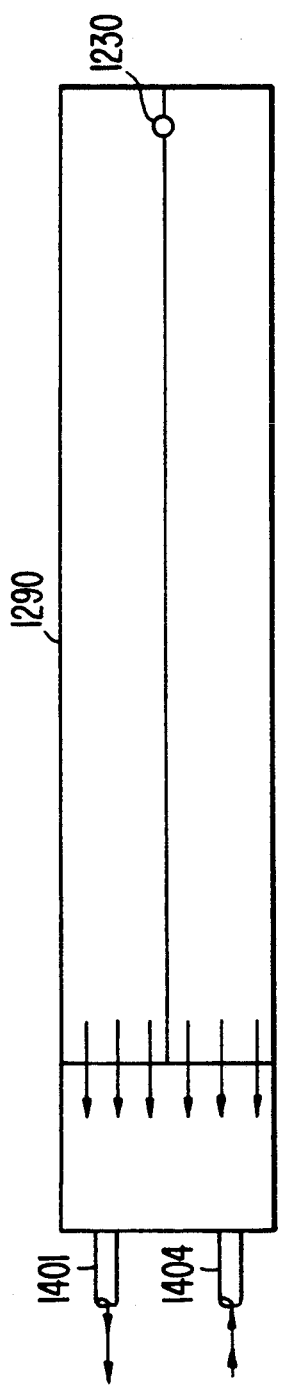
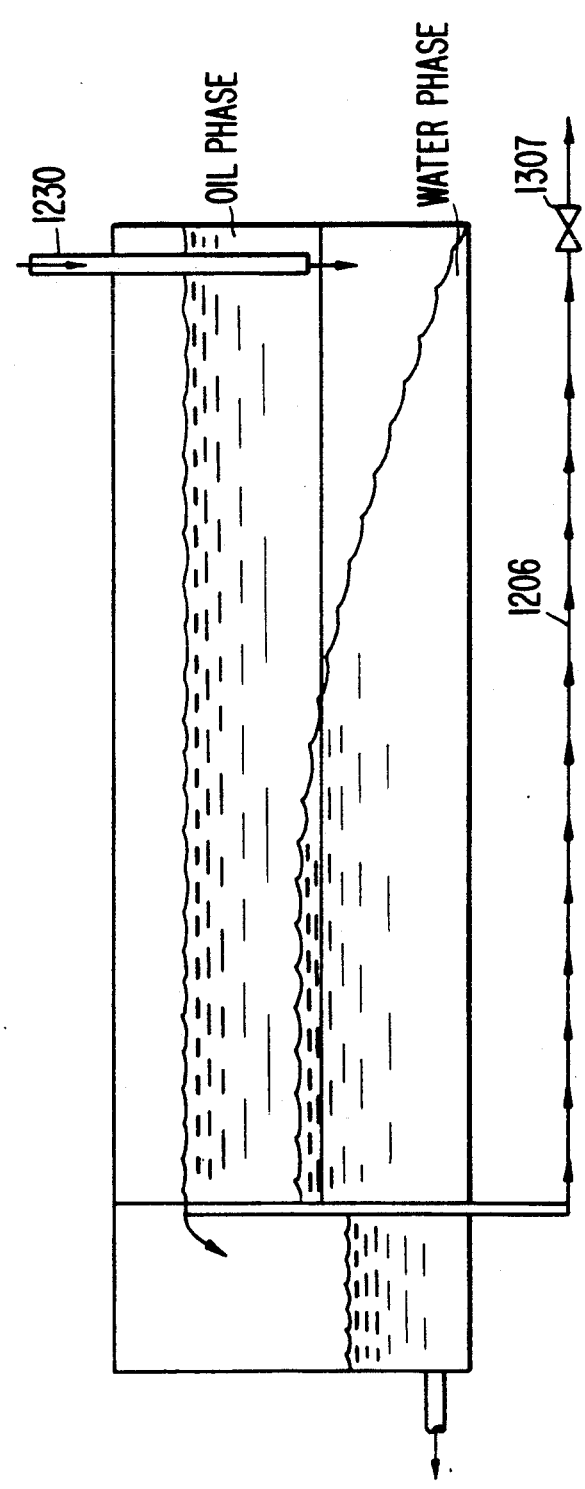

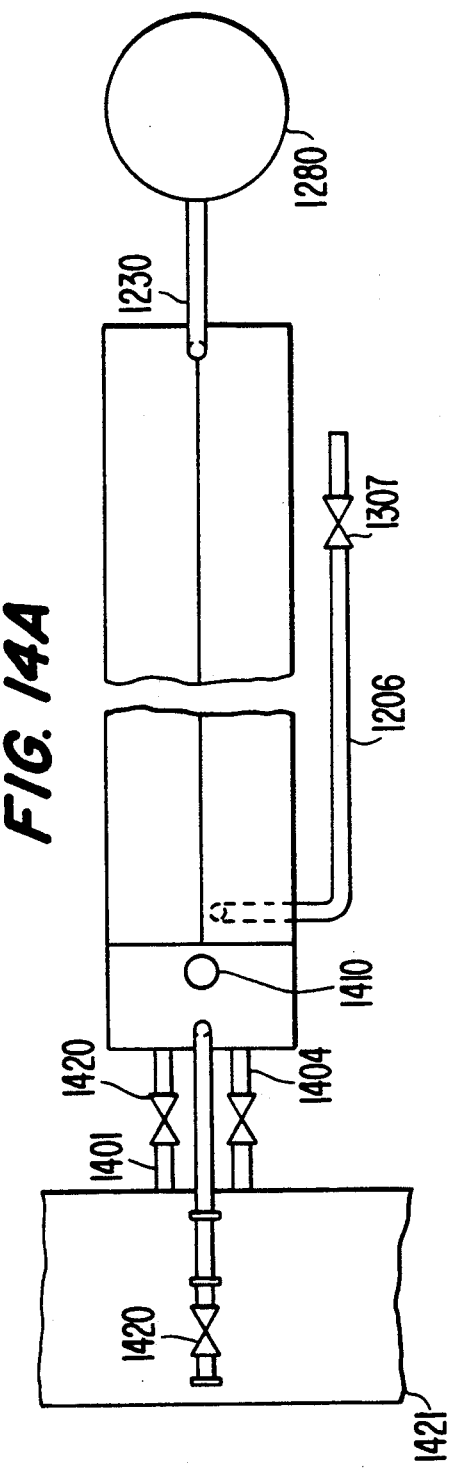
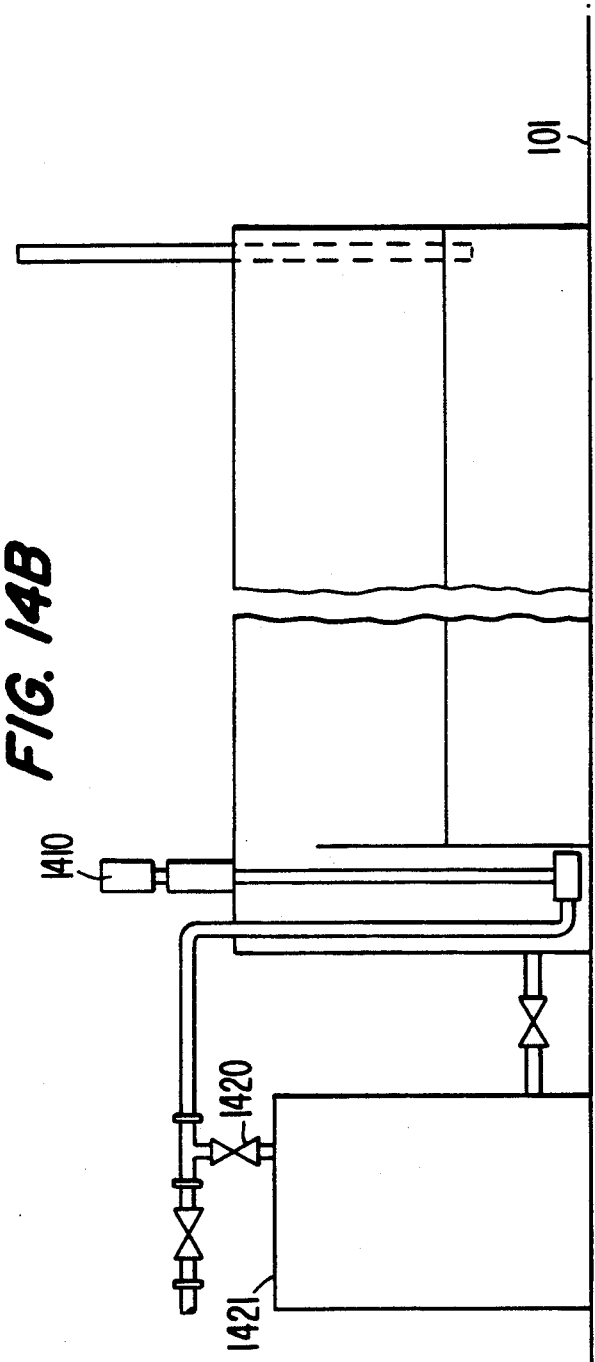
FIG. 14A
FIG. 14B

BARGE MOUNTED OIL RECOVERY AND RECYCLE SYSTEM

BACKGROUND OF THE INVENTION

Prior art applied to the recovery of Oil and Oil Products from the surface of both Sea Water and Fresh Water have not addressed the primary problem of the small differences in specific gravity between the water and the organic liquid and the effects of Sun, Wind and Waves on relative small differences that provide for a film of Oil or Oil Product to stay on the surface of the Water. The maximum weight per gallon of Sea Water is 9.0 pounds per gallon, the minimum weight of Fresh Water is 8.33 pounds per gallon and the average weight of Crude Oil and many processed Oil products is 8.2 pounds per gallon.

When the Oil or Oil Product is first discharged into either Sea Water with a weight of 9.0 pounds per gallon, Fresh Water at 8.33 pounds per gallon or Brackish Water with a weight of any where between 8.33 and 9.0 pounds per gallon, there is an adequate difference in specific gravity to provide efficient recovery of the Oil or Oil Products from the surface of the water.

Within a short period of time, dependent on the weather conditions, this opportunity for efficient recovery is lost. This is due to the effect of the Sun and Wind which causes the evaporation of the lighter fractions of the Oil or Oil Product, which results in an increase in its specific gravity. The second factor is the action of Waves which cause a breakdown of the surface tension of the Oil or Oil Product film, coats droplets of the organic material with water; thus causing a further increase in the specific gravity of the Oil or Oil Product. The Oil film very soon becomes a blanket of Oil droplets below the surface of the water phase and cannot be recovered by the application of surface skimming techniques.

Prior art is demonstrated by all of the following references. Surface containment means with surface skimmer as defined in U.S. Pat. No. 4,049,554. Surface containment with air bubble barrier and suction device as defined in U.S. Pat. No. 3,966,613. Surface containment with vacuum suction device as defined in U.S. Pat. No. 3,578,171. Velocity surface skimmers as defined in U.S. Pat. Nos. 3,737,040, 3,690,464, 3,875,062 and 3,823,828, Rotating Drums as defined in U.S. Pat. Nos. 3,753,496 and 3,853,767. Enless Belts as defined in U.S. Pat. Nos. 3,314,540 and 3,314,545. Stationary pressure differential systems as defined in U.S. Pat. Nos. 3,465,882, 3,615,017, 3,715,034 and 3,966,615. All of this prior art does not address the major problem of sub-surface Oil droplets.

The second consideration defined in the background of the invention is the effect of waves on the Oil film on the surface of the Water. Prior art has addressed this problem in the main by the use of internal tanks in a vessel and ballast tanks for adjustment of the pitch and the depth of the vessel. Internal tanks with ballast tanks for the adjustment of pitch and depth are defined in U.S. Pat. No. 3,630,376. Multiple interior tanks in a vessel for the separation and concentration of the skimmer Oil are defined in U.S. Pat. Nos. 4,399,040, 4,477,348 and 3,922,225. This approach has not provided an efficient solution to the problem of collecting Oil from the surface of water.

Prior art concerning on board concentration of the captured Oil is defined in U.S. Pat. Nos. 4,795,567, 3,578,171, 3,219,190, 4,178,247 and 3,578,171. None of the above systems have proven to be efficient in the on board concentration of skimmed Oil due primarily to batch or multiple batch operation in place of continuous operation.

The Barge Mounted Oil Recovery and Recycle System addresses the problem of subsurface Oil droplets and provides a method for the immediate start of recovery operation to minimize the effect of time on the physical properties of the Oil Film. The Barge Mounted Oil Recovery and Recycle process also provides a high efficiency continuous on board concentration process for the Oil/Water mixture received from the collection processes.

SUMMARY OF THE INVENTION

The Barge Mounted Oil Recovery and Recycle System is designed as an affordable replacement for currently used Pilot Boats that are used to take Pilots to Tankers outside of Coastal Waters as well as returning Pilots from outbound vessels. Pilots who are trained in the systems aboard the Oil Recovery Barge and are qualified to determine if weather is suitable for efficient recovery of any Oil spill would be placed in command of the Oil Recovery Barge and would keep it under his command for the entire trip of the tanker as an escort from the time it entered the Coastal Waters of a Bay, Inlet or River until it was safely at the Harbor Moorage. Also, the same rules would apply to outbound tankers.

If weather conditions exceed the capacity of the Oil Recovery Barge for efficient operation, tankers would not be allowed to leave the Harbor or enter the Coastal Waters. This Method of utilizing this invention could be easily implemented by the simple means of training of Harbor Pilots, modification of Harbor entry and departure rules and procurement of sufficient numbers of Oil Recovery Barges to meet the tanker traffic in each Harbor. By providing this type of escort service, the problem of immediate response can be solved.

The Barge Mounted Oil Recovery and Recycle System involves six major process systems which are combined to produce the desired overall result of this invention. The first system is designed to provide flotation of subsurface Oil droplets to the surface of the water by a method of placing a distribution header at a definite distance below the surface of the water and using a free movement of the distribution header with a float system that follows the wave action.

The second process system involves a centrifugal recirculation pump that discharges into the air diffuser system and provides both fine bubble entrained air into the recirculated water as well as increasing the amount of dissolved air in the recirculated water. The gas diffuser is supplied with air under pressure from an electric driven air compressor. The recirculated water containing large amounts of entrained Air bubbles and a maximum amount of dissolved Air is delivered under pressure by pipelines attached to the wave following float system, which in turn is fed the distributor header from both ends of the header. The internal pressure within the diffuser housing, caused by flow restriction, exceeds one atmosphere of positive pressure. This in turn increases the solubility of air above the normal limits of saturation and results in a super saturated condition when the pressure is reduced at the flotation distributor header. The results are the formation of Air micro-bubbles which will attach themselves to very small droplets of submerged Oil and cause them to raise to the surface of the water where they will form a compacted film which can be easily collected.

The third process system is an Oil film collection system in which the vacuum suction header is positioned vertically by a wave following float. The float is mounted on the wave following support member defined in the first process system but is allowed independent vertical movement based on the use of a second float on which the vacuum suction header is mounted. The vacuum suction header is attached to the wave following float with support arms that allow positioning of the vacuum suction header in both the vertical and the rotational position with relation to the float. The positioning is provided by two sets of fluid power hydraulic cylinders, one anchored directly to the wave following float and the second set anchored to the vacuum suction header support arms in order to provide the needed rotational positioning of the vacuum suction header to provide the proper angle of attack for the vacuum header pick up tapered slots.

The fourth process system provides the vacuum supply to the vacuum suction header and consists of pipelines mounted on the float positioning support frame as defined in the first process system. The system consists of flexible vacuum hoses, combination vertical primary Oil/Water separation column and vacuum receiver and an electrically driven water seal vacuum pump. The pipelines and flexible vacuum suction hoses deliver the Oil/Water mixture collected by the vacuum suction header into approximately the vertical centerpoint of the combined vacuum receiver and primary Oil/Water separation column. The column is of sufficient height to allow for three separate phase levels in the column and a barometric discharge leg for removal of the separated Oil from the top of the column into the secondary stage gravity separator. The sizing of the electrically driven vacuum pump from the standpoint of air volume handled and the level of vacuum obtained would depend on the size of the vacuum suction header and the capacity required for the system. The recirculated water withdrawn by use of a control valve from the bottom of the Oil/Water primary separation column would be introduced into the suction line of the centrifugal pump defined in process system two.

The fifth process system is a horizontal V-bottom single flow direction, single pass Oil/Water separator that receives the flow from the barometric discharge leg of the primary vacuum receiver and separator column. This flow passes the length of the secondary gravity Oil/Water separator with the Oil phase discharged over an overflow weir into a collection sump and the Water phase removed from the bottom of the V-bottom of the secondary gravity separator by a control valve and returned to the suction of the centrifugal pump as defined in process system number two.

The sixth process system consists of a series of on board Oil storage tanks that can be filled by either gravity flow or by a pump as required. The gravity flow is controlled by control valves in pipeline connecting the storage tanks and the secondary gravity separator sump defined in process system number five. A vertical positive displacement Oil transfer pump is mounted in the sump of the secondary gravity separator which can be used to fill the storage tanks to maximum levels when gravity flow limits have been reached. The same transfer pump can be used to transfer Oil from the Oil Recovery Barge to an independent Oil transfer Barge. The transferred Oil could be supplied from any of the on-board storage tanks or the direct flow from the secondary gravity separator by the operator selection of control valves.

BRIEF DESCRIPTION OF THE DRAWINGS

FIG. 2-A is an elevation drawing of the support frame.

FIG. 3-A is an elevation drawing of the mounting frame.

FIG. 5-A is an elevation drawing of the wave compensating float attached to the support frame.

FIG. 6-A is an elevation drawing of the mounting of the flotation and Oil film compaction distributor header and pipelines on the support frame.

FIG. 6-B is a detail drawing of the flotation and Oil film compaction distributor and pipelines.

FIG. 6-C is a sectional view of the flotation and Oil film compaction distributor header.

FIG. 9-A is an elevation drawing of the mounting for vertical travel of the wave following vacuum skimmer float.

FIG. 9-B is a detail drawing of the mounting of the piping on the support frame for the vacuum skimmer.

FIG. 10-A is an assembly drawing of the wave following float and vacuum skimmer

FIG. 10-B is a detail drawing of the vacuum skimmer header mounting and positioning system.

FIG. 13 A, B, C are flow diagrams of the secondary gravity Oil/Water separation tank.

FIG. 14-A is a plan view drawing of the secondary gravity Oil/Water separation tank.

FIG. 14-B is an elevation drawing of the secondary gravity Oil/Water seperation tank.

DETAILED DESCRIPTION OF THE PREFERRED EMBODIMENTS

Figure 1:
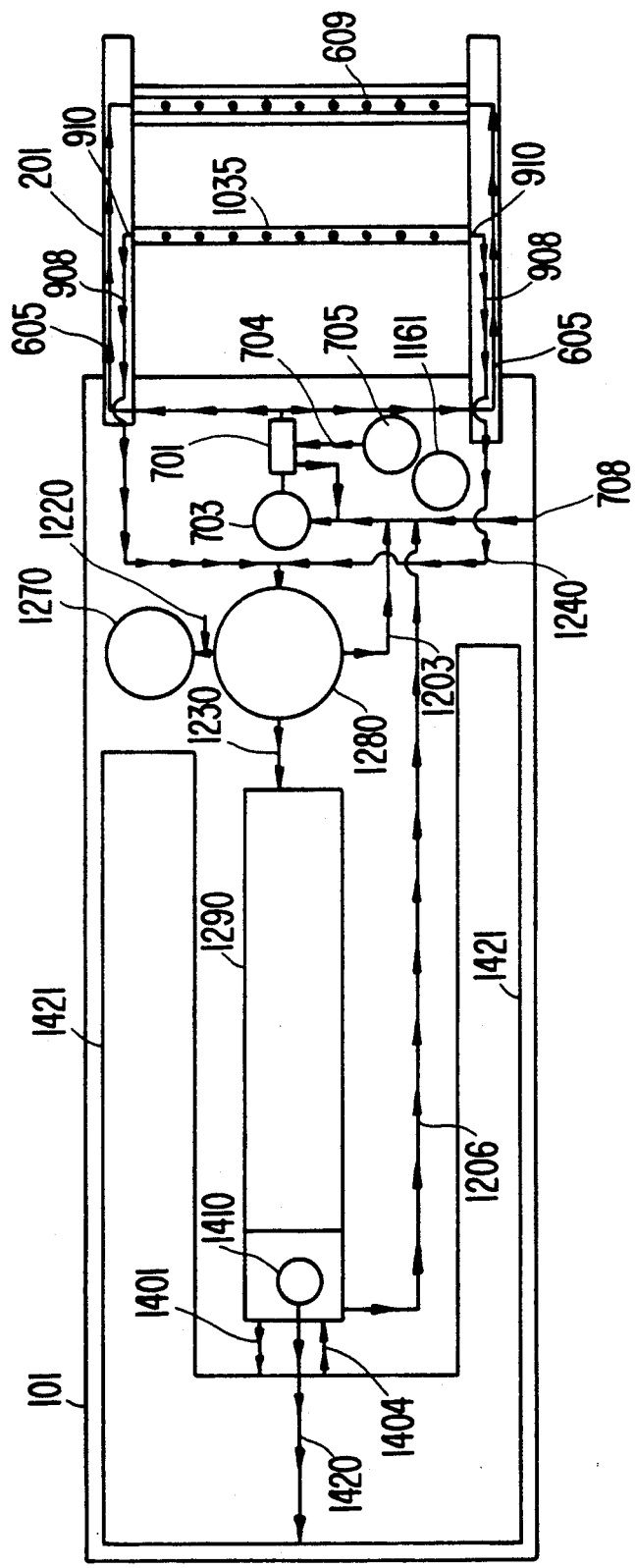
FIG. 1 is a flow diagram of all six process systems.

FIG. 1 is a flow diagram of the six process systems that make up the Oil Recovery Barge. The major components of these process systems shown in FIG. 1 are 101 the Barge Hull, 201, the support frame, 703 the vertical centrifugal pump, 701 the mult-effect multi-injection Diffuser, 705 air compressor, 1161 fluid power hydraulic pump, 1270 vacuum pump, 1280 vacuum receiver and primary Oil/Water separation column, 1290 secondary gravity seperation tank, 1410 Oil transfer pump and 1421 Oil Storage tanks.

Figure 2:
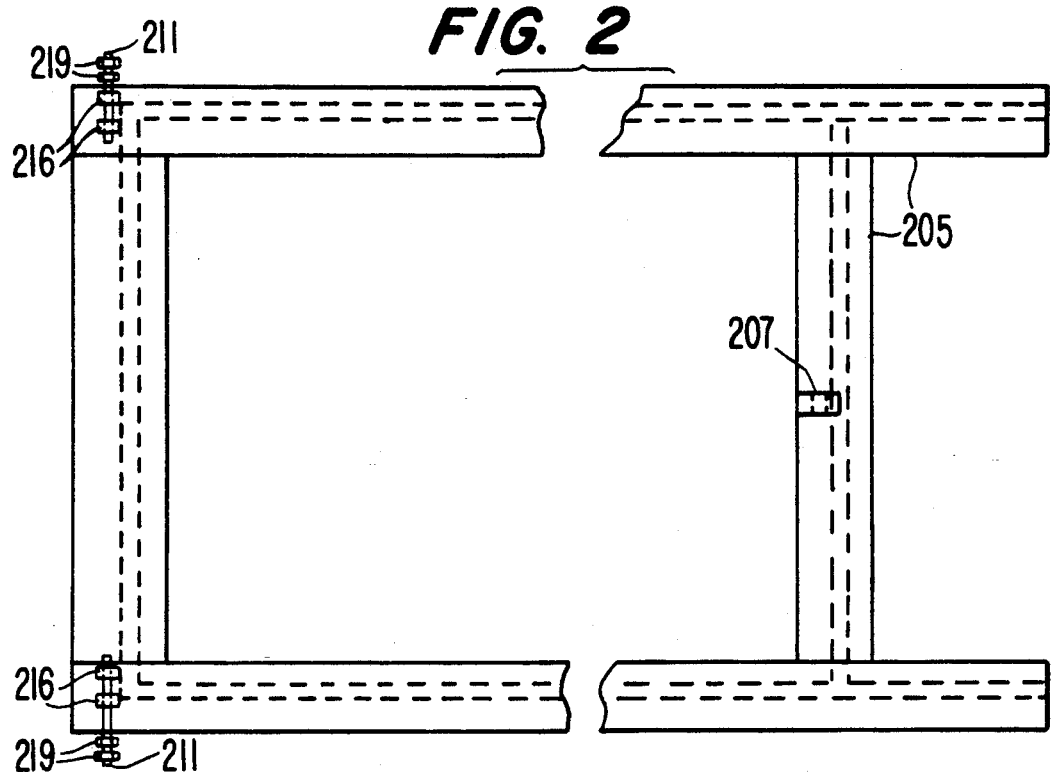
FIG. 2 is a plan view drawing of the support frame.
Figure 2A:
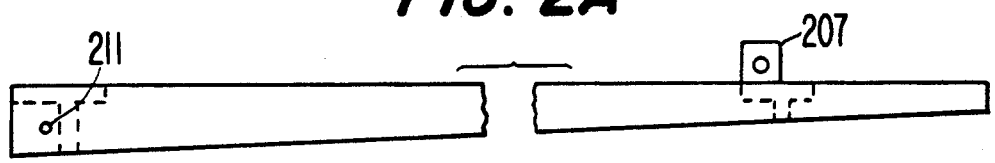

FIGS. 2 and 2-A are drawings of the support frame including 205 T channel welded frame, 207 cable hook, 211 stub shafts, 216 bearings and 219 lock nuts.

Figure 3:
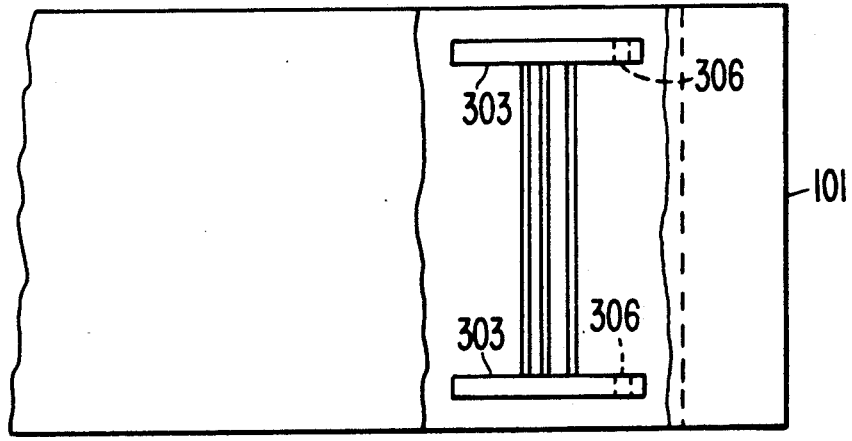
FIG. 3 is a plan view drawing of the mounting frame.
Figure 3A:
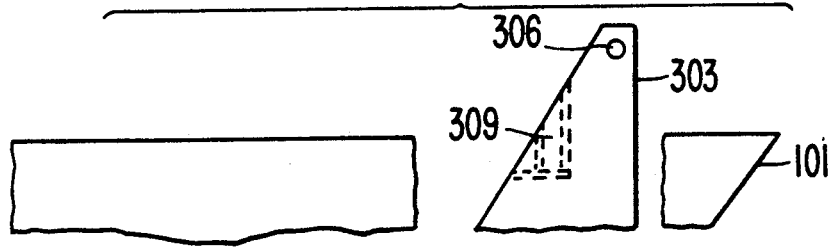

FIGS. 3 and 3-A are drawings of the vertical mounting frame used to hold the support frame which includes 303 the vertical supports, 306 holes for the 211 stub shafts, 309 horizontal support channels and 101 barge hull.

Figure 4:
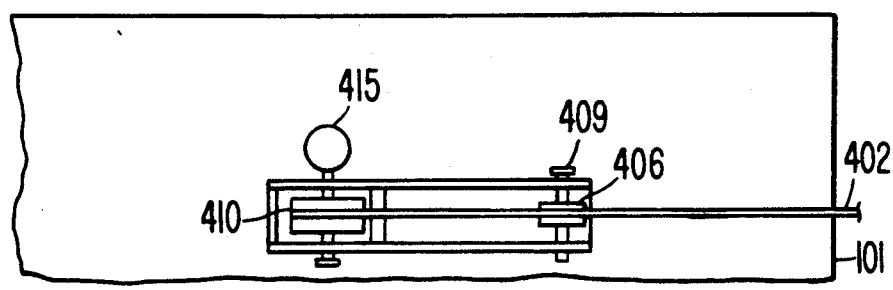
FIG. 4 is a plan view drawing of the hoist system for the support frame.
Figure 4A:
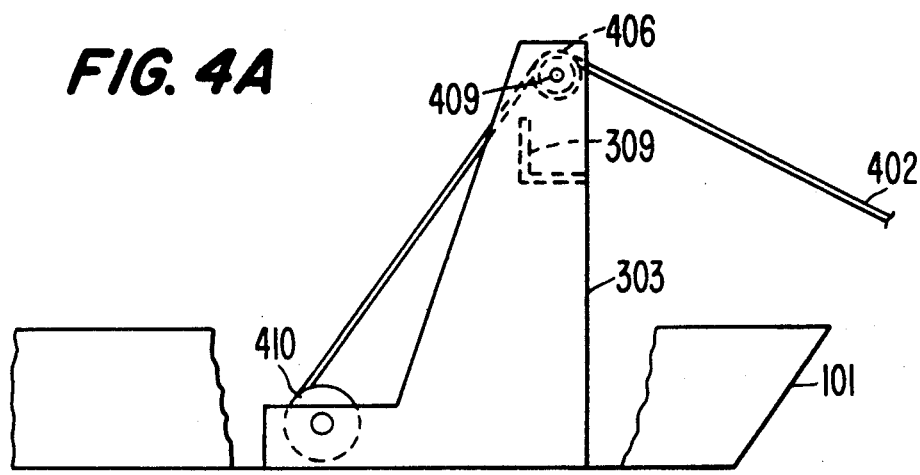
FIG. 4A is an elevation drawing of the hoist system for the support frame.

FIGS. 4 and 4-A are drawings of the hoist system for the support frame 201 which includes 402 cable, 406 cable pulley, 409 cable pulley shaft, 410 hoist drum, 415 hydraulic motor and gear drive, 309 horizontal support channels, 303 vertical supports and 101 barge hull.

Figure 5:
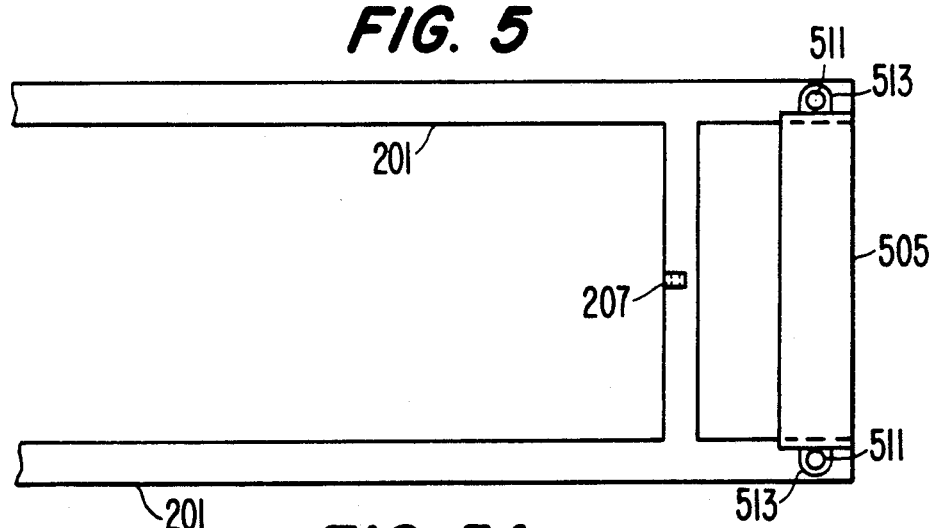
FIG. 5 is a plan view drawing of the wave compensating float attached to the support frame.
Figure 5A:
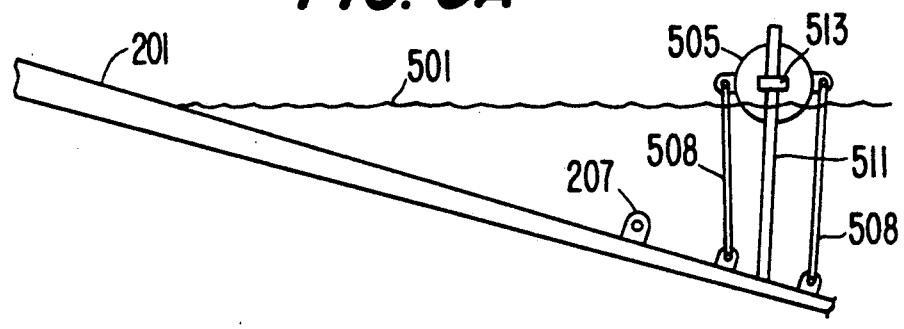

FIGS. 5 and 5-A are drawings of the wave compensating float attached to the support frame which includes 501 water surface, 505 float, 508 cables, 511 guide rod, 513 guide rod follower, 207 cable hook and 201 support frame.

Figure 6:
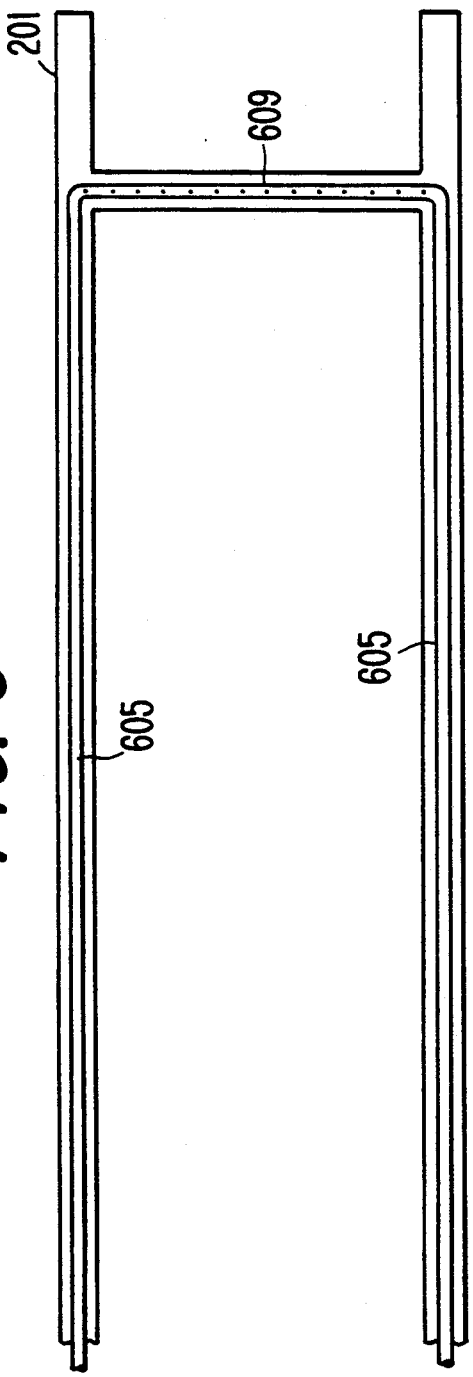
FIG. 6 is a plan view drawing of the mounting of the flotation and Oil film compaction distributor header and pipelines on the support frame.
Figure 6A:
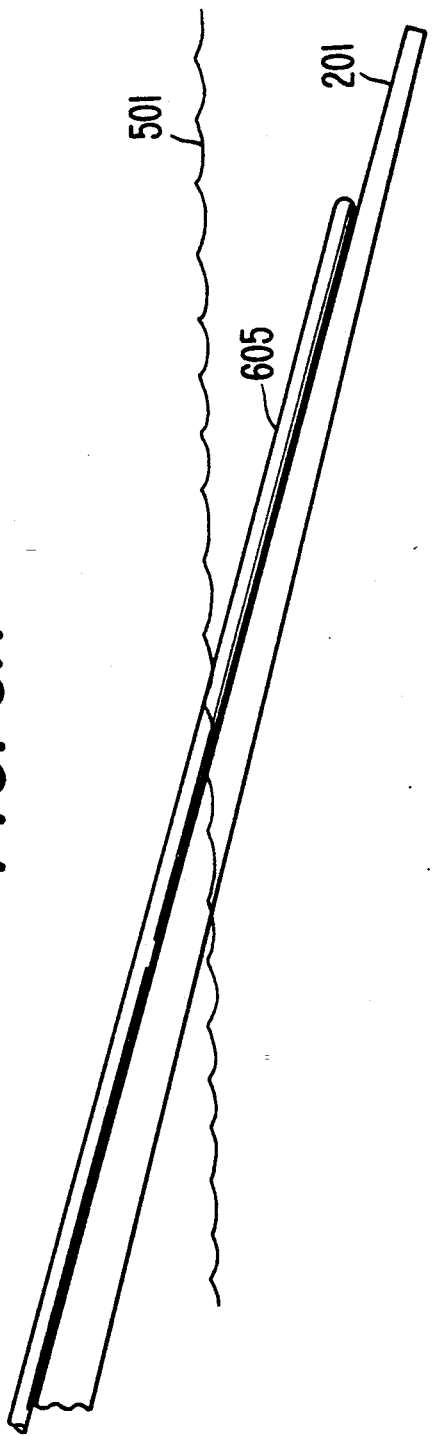
Figure 6B:
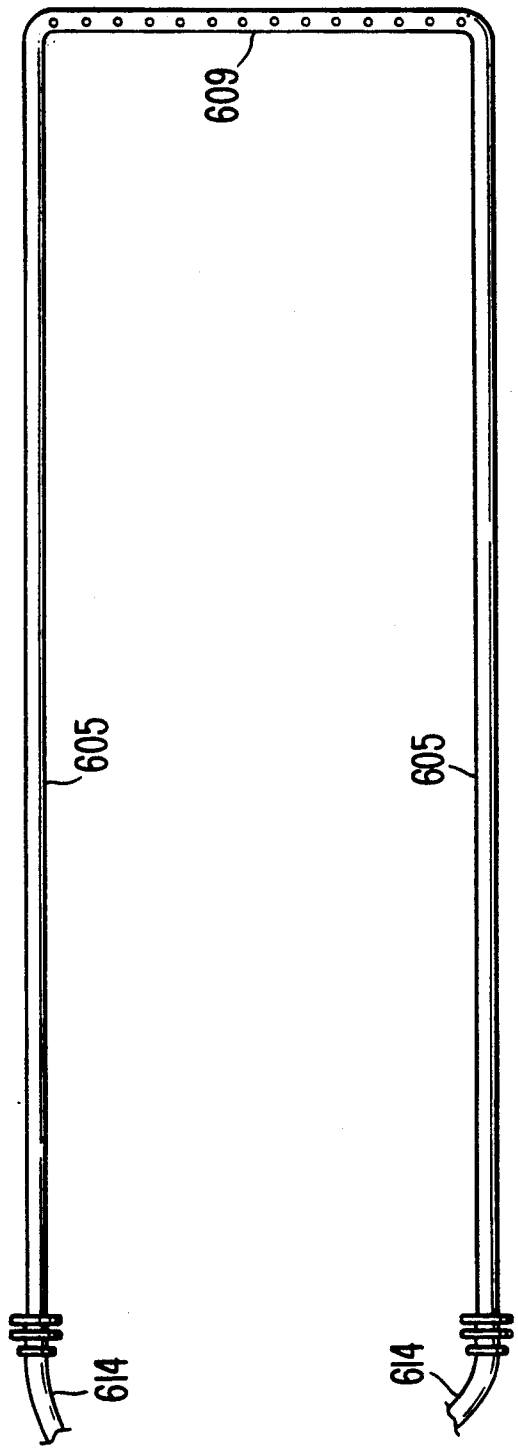
Figure 6C:
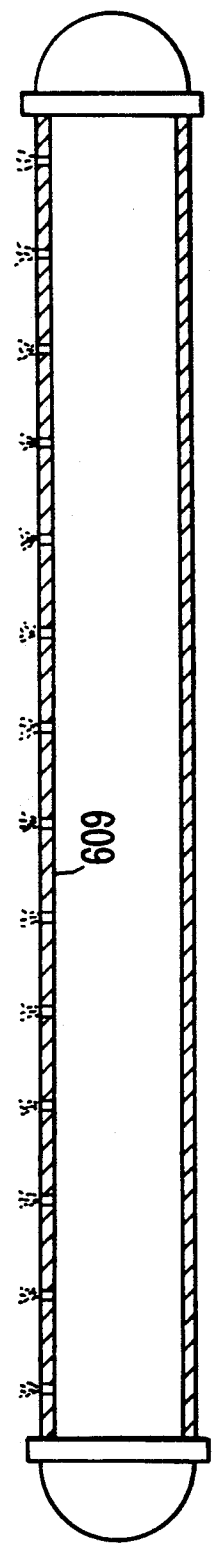

FIGS. 6 and 6-A are drawings of the flotation and Oil film compaction distributor header and pipeline on the support frame which includes 605 supply pipelines, 609 Oil film compaction distributor header, 501 water surface and 201 support frame.

FIG. 6-B is a detail drawing of the flotation and Oil film compaction distributor header and pipelines which includes 605 supply pipelines, 609 Oil film compaction distributor header and 614 flexible hoses.

FIG. 6-C is a sectional view of the 609 flotation and Oil film compaction distributor header.

Figure 7:
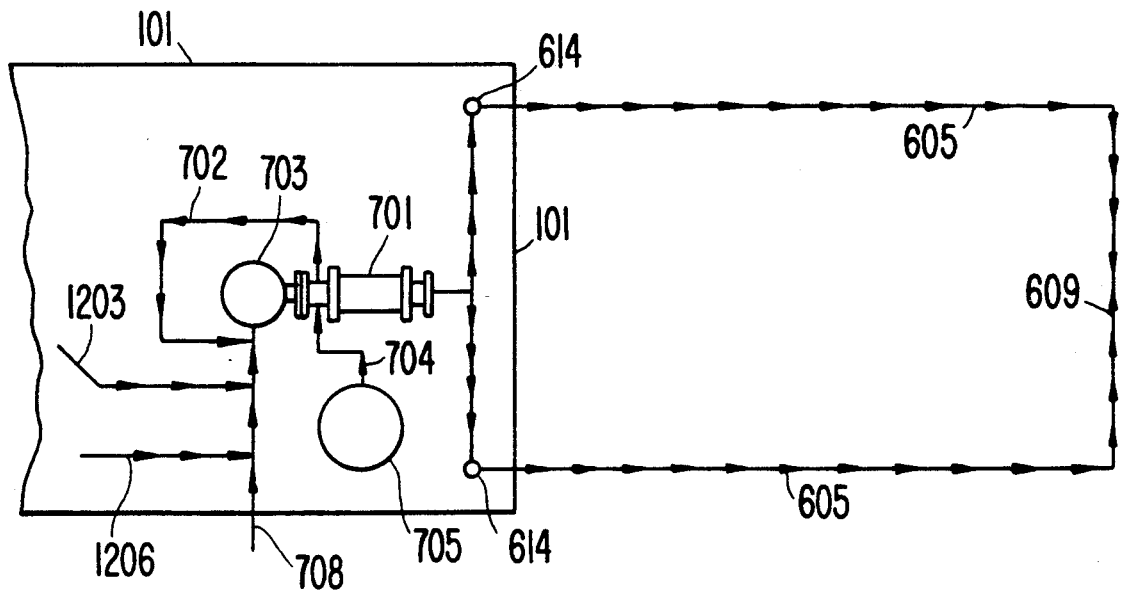
FIG. 7 is a flow diagram of the flotation and Oil film compaction system.

FIG. 7 is a flow diagram of the flotation and Oil compaction process system which includes 701, multi-effect multi-injection diffuser, 702 diffuser strainer flush pipeline, 703 vertical centrifugal pump, 704 compressed air supply pipeline, 705 air compressor, 708 exterior suction line for 703, 1203 vacuum receiver and primary separation column water recycle pipeline, 1206 secondary gravity Oil/water separation tank water recycle pipeline, 605 supply pipelines, 609 Oil film flotation and compaction distributor header, 614 flexible hoses and 101 barge hull.

Figure 8:
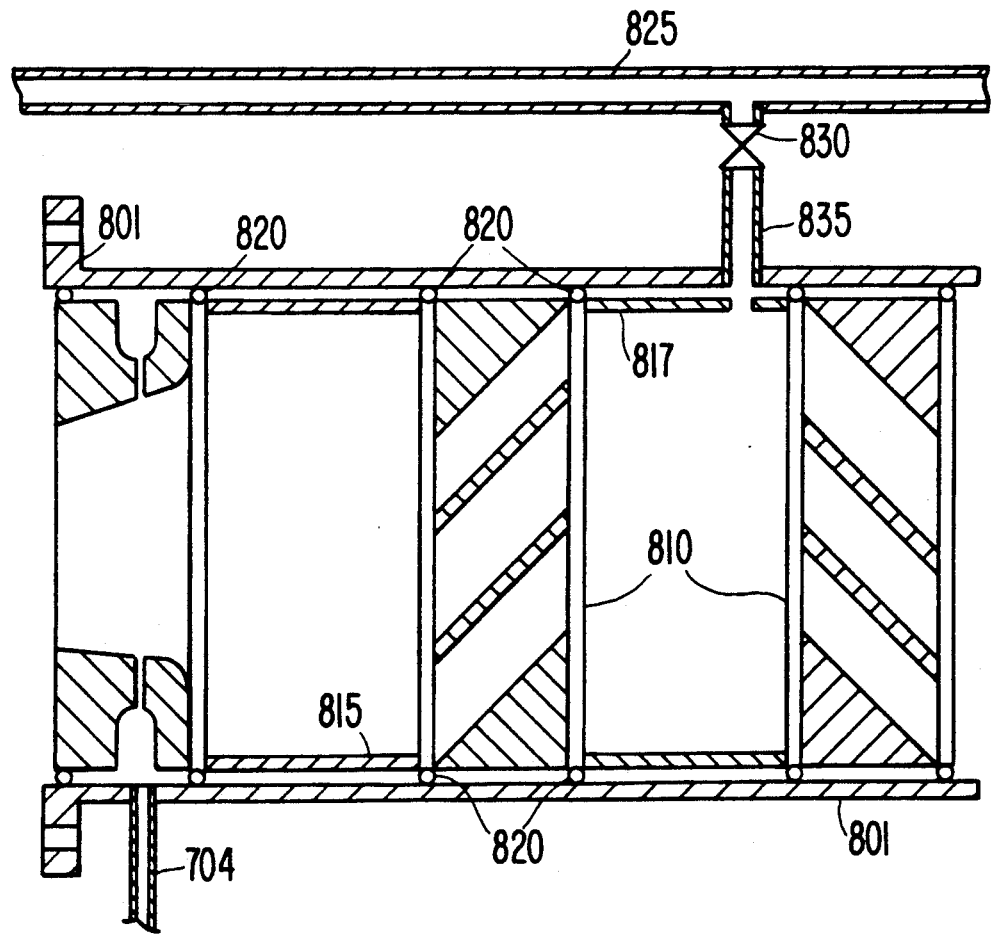
FIG. 8 is a sectional view of one stage of the multi-stage multi-port diffuser.

FIG. 8 is a sectional view of one stage of the 701 multi-effect multi-injection diffuser which includes 801 diffuser housing, 804 diffuser air distribution ring, 810 diffuser elements, 815 diffuser spacers, 817 diffuser injector inlet spacers, 820 O rings, 825 injector supply pipelines, 830 injector flow control valves, 835 stage injector pipelines and 704 compressed air supply pipeline.

Figure 8A:
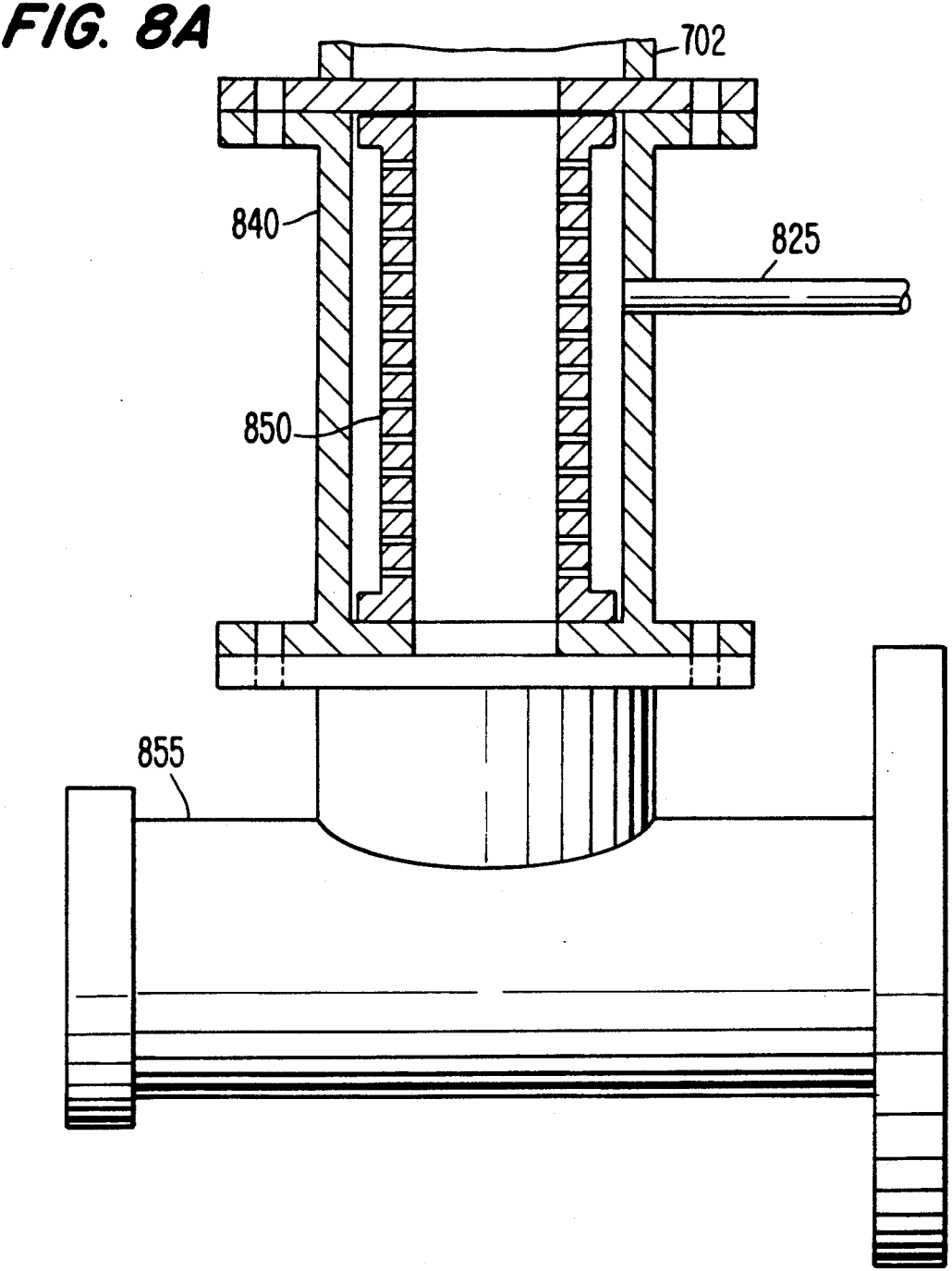
FIG. 8A is a detail drawing of the diffuser inlet spool piece and the strainer for the multi-injectors.

FIG. 8A is a detail drawing of the diffuser inlet spool piece and the strainer for the multi-injectors which includes 825 injector supply lines, 840 strainer housing, 850 strainer element and 855 diffuser inlet spool piece.

Figure 8B:
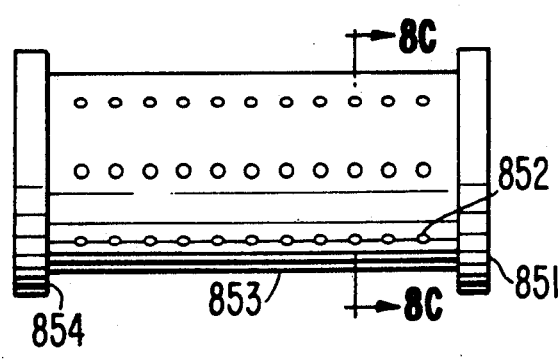
FIGS. 8B and 8C are detail drawings of the strainer element.
Figure 8C:
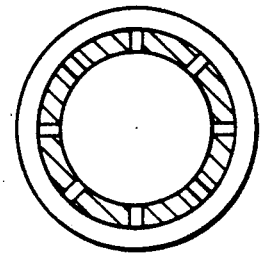

FIGS. 8B and 8C are detail drawing of the strainer element 850 which includes 851, upper flange, 852 strainer holes, 853 strainer body and 854 lower flange.

Figure 8D:
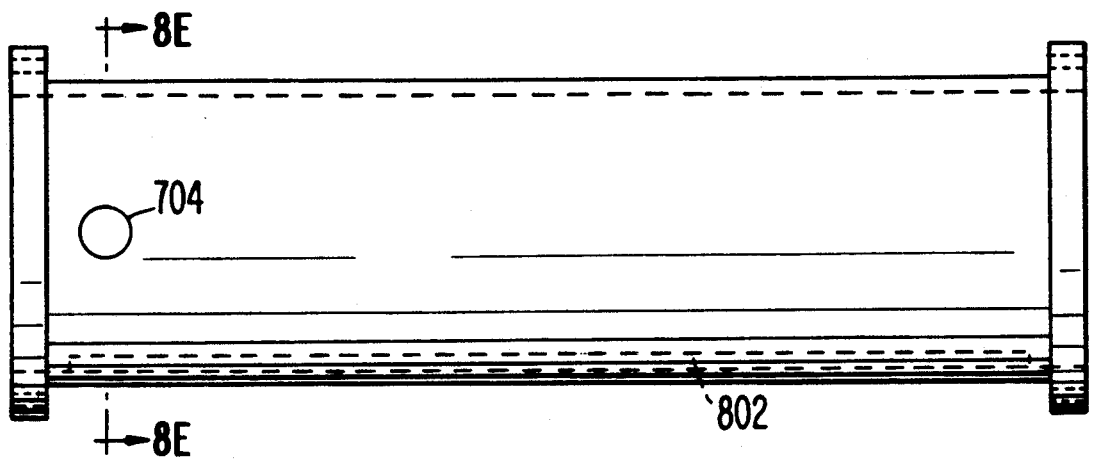
FIGS 8D and 8E are detail drawings of the diffuser housing.
Figure 8E:
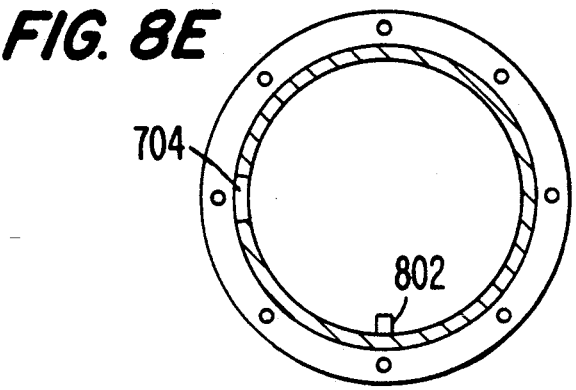

FIGS. 8D and 8E are detail drawings of 801 diffuser housing which includes 802 anti-rotation positioning guide and 704 compressed air supply pipeline.

Figure 8F:
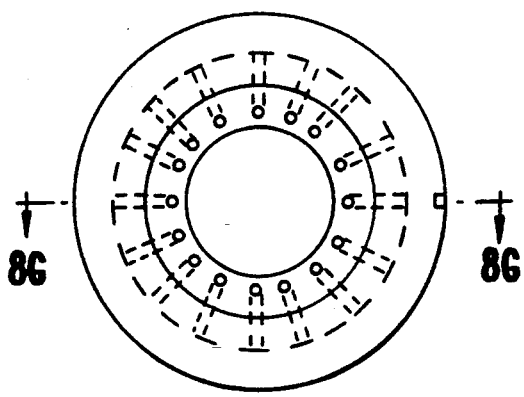
FIGS. 8F and 8G are detail drawings of the diffuser air distribution ring.
Figure 8G:

FIGS. 8F and 8G are detail drawings of the diffuser air distribution ring 804.

Figure 8K:
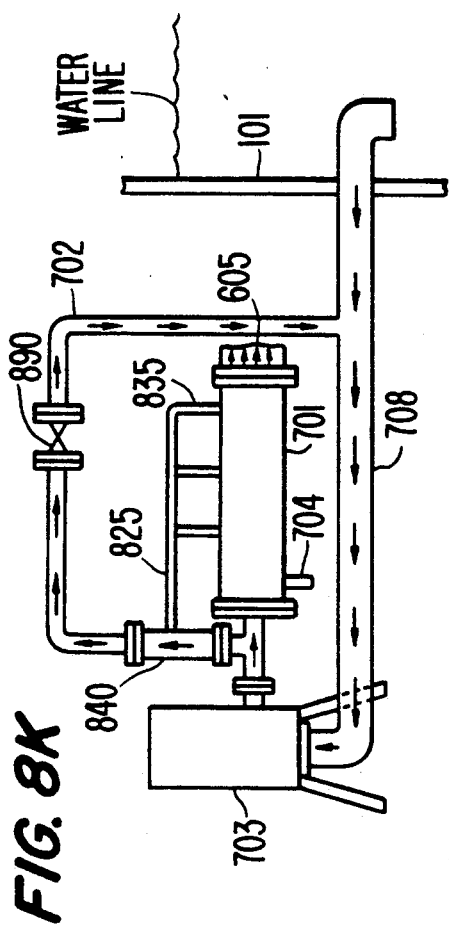
FIG. 8K is a flow diagram of the diffuser system.
Figure 8J:
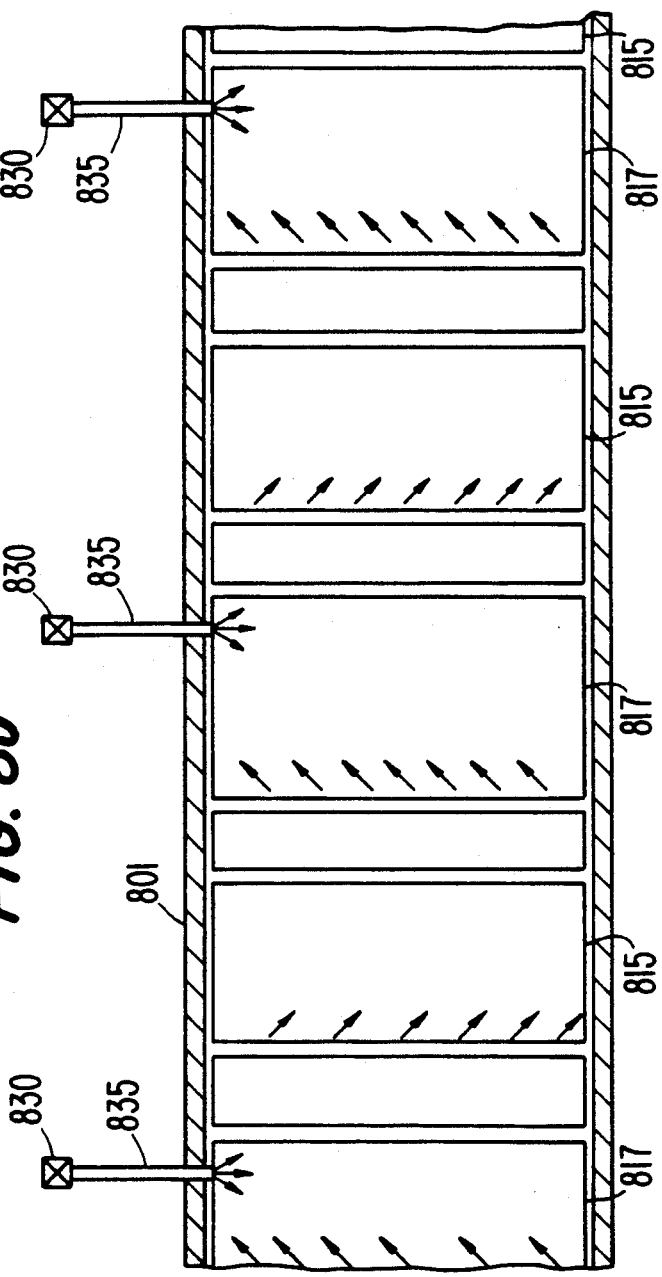
FIG. 8J is a section detail drawing of the multi-effect multi-injection diffuser showing the liquid flow direction.
Figure 8H:
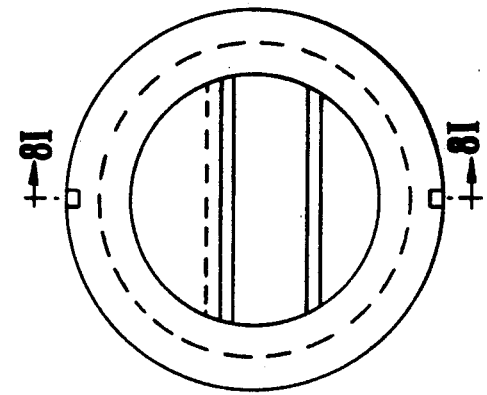
FIGS. 8H and 8I are detail drawings of the reversible diffuser elements.
Figure 8I:
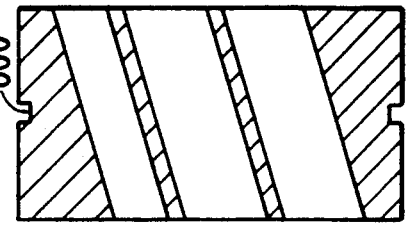

FIGS. 8H and 8I are detail drawings of a reversible diffuser element 810 showing 860 the mating slot for 802 the anti-rotation positioning guide in the 801 diffuser housing.

FIG. 8J is a sectional drawing of the multi-effect multi-injection diffuser 701 which includes 801 diffuser housing, 815 diffuser spacer, 817 diffuser injector inlet spacer, 830 injector flow control valve and 835 stage injector pipelines.

FIG. 8K is a flow diagram of the multi-effect multi-injection diffuser system which includes 101 barge hull, 605 supply pipelines, 701 diffuser, 702 diffuser strainer flush pipeline, 703 vertical centrifugal pump, 704 compressed air supply pipeline, 708 exterior suction pipeline for 703, 825 injector supply pipeline, 835 stage injector pipelines and 840 strainer housing.

Figure 9:
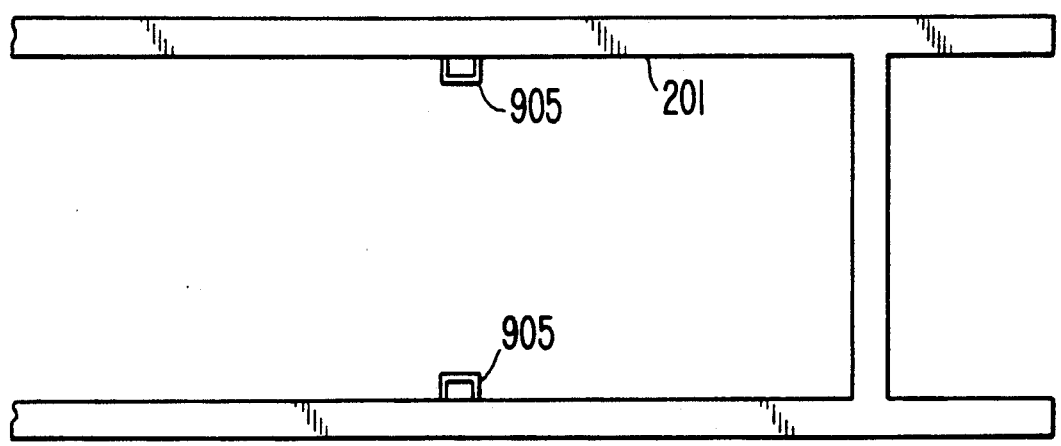
FIG. 9 is a plan view drawing of the mounting for vertical travel of the wave following vacuum skimmer float.
Figure 9A:
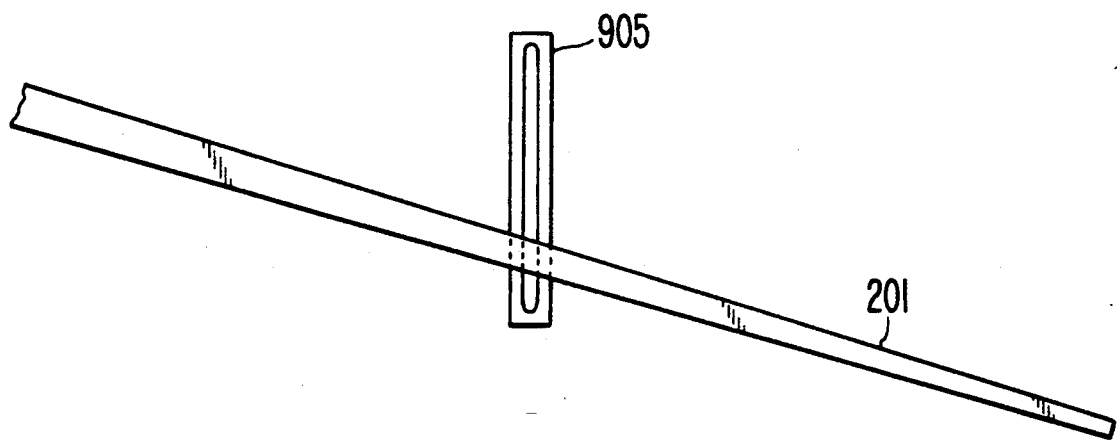
Figure 9B:
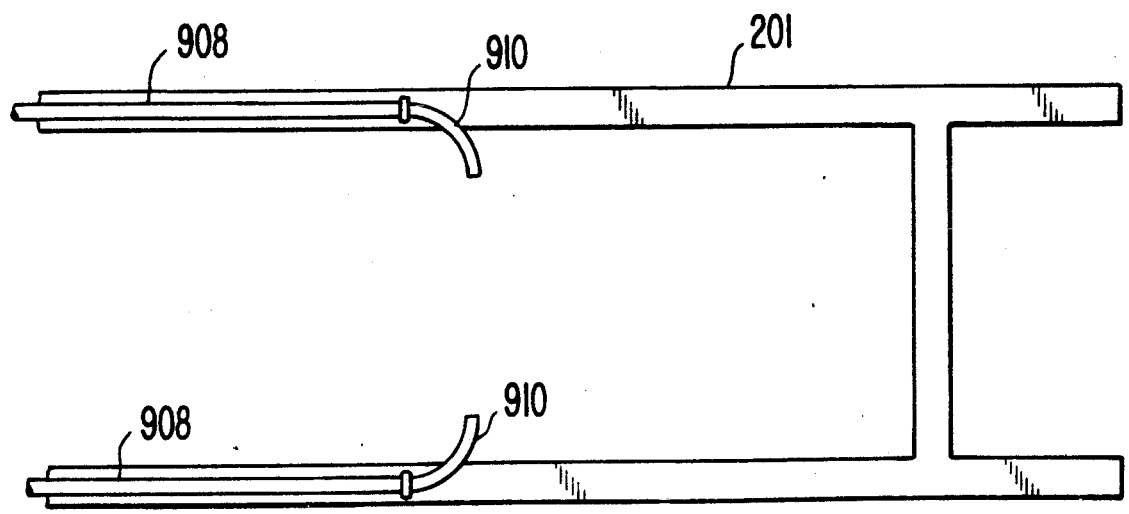

FIGS. 9 and 9-A are drawings of the mounting for vertical travel of 1001 the wave following vacuum skimmer float which includes 201 support frame and 905 vertical travel guides.

FIG. 9-B is a detail drawing of the mounting of the pipelines on the support frame for 1001 the vacuum skimmer which includes 201 support frame, 908 rigid suction pipelines and 910 flexible suction hoses.

Figure 10:
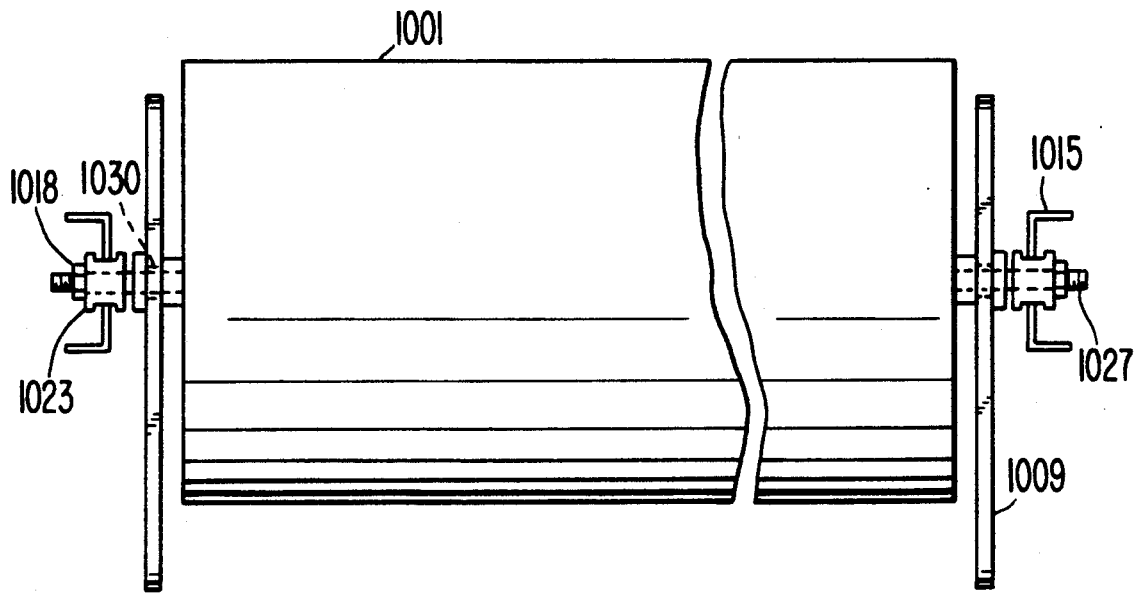
FIG. 10 is a detail drawing of the wave following vacuum skimmer float.
Figure 10A:
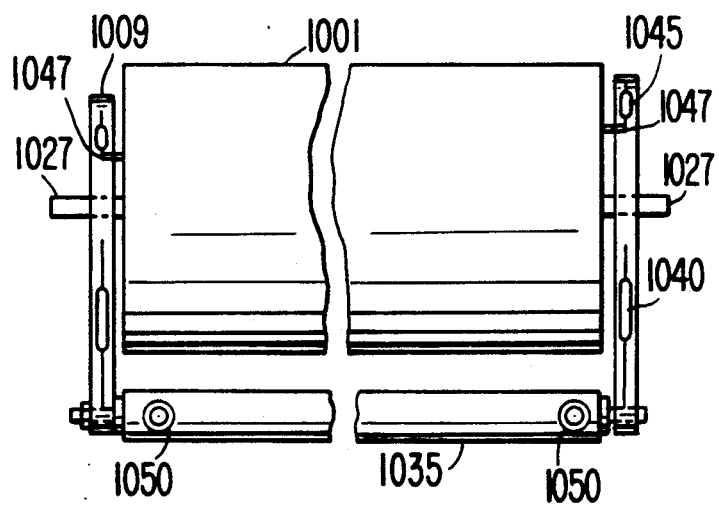
FIGS. 10C and 10D are detail drawings of the vacuum skimmer header.
Figure 10B:
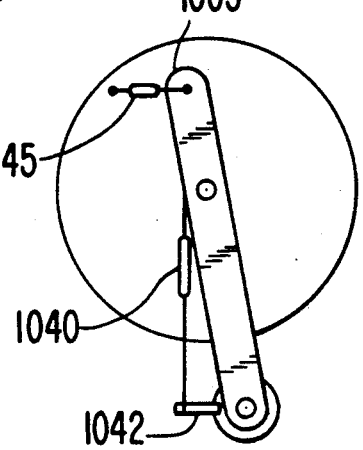

FIG. 10 is an assembly drawing of 1001 the wave following vacuum skimmer float which includes 1009 vacuum skimmer header rotating support arm, 1015 vertical travel mounting frame for 1001 vacuum skimmer float, 1018 locking nuts, 1023 split guides, 1027 vacuum skimmer float shafts and 1030 bearings.

FIG. 10-A and 10-B drawings of 1001 the wave following float and vacuum skimmer which includes 1001 vacuum skimmer float, 1009 vacuum skimmer header rotating support arm, 1035 vacuum skimmer header, 1040 vacuum skimmer header rotating hydraulic cylinders, 1042 vacuum skimmer header rotating arm, 1045 vacuum skimmer header position hydraulic cylinders, 1047 positioning cylinder operating support pins, 1050 connecting flanges for 910 flexible suction hoses and 1027 wave following float shafts.

Figure 10C:
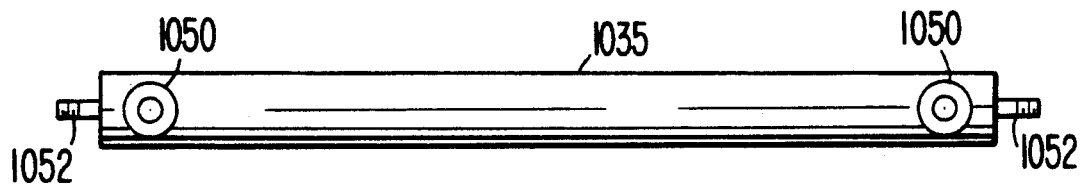
Figure 10D:
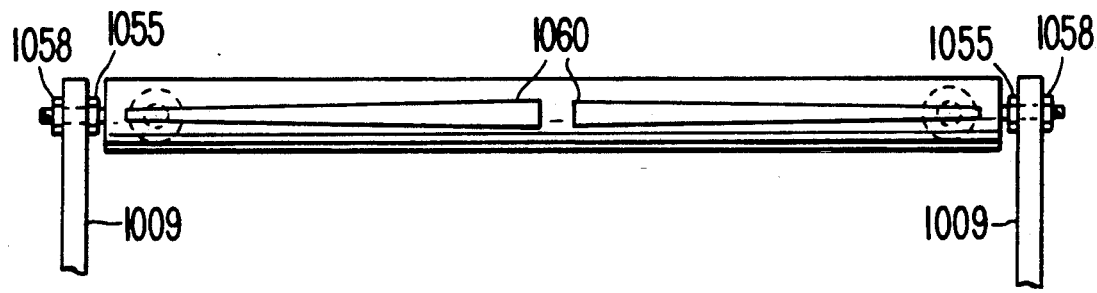

FIGS. 10C and 10D are detail drawings of the vacuum skimmer header 1035 which includes 1009 vacuum skimmer header rotating support arm, 1050 connection flanges for 910 flexible suction hoses, 1052 vacuum skimmer header shafts, 1055 bearings, 1058 locking nuts and 1060 tapered inlet slots for vacuum reduction compensation.

Figure 11:
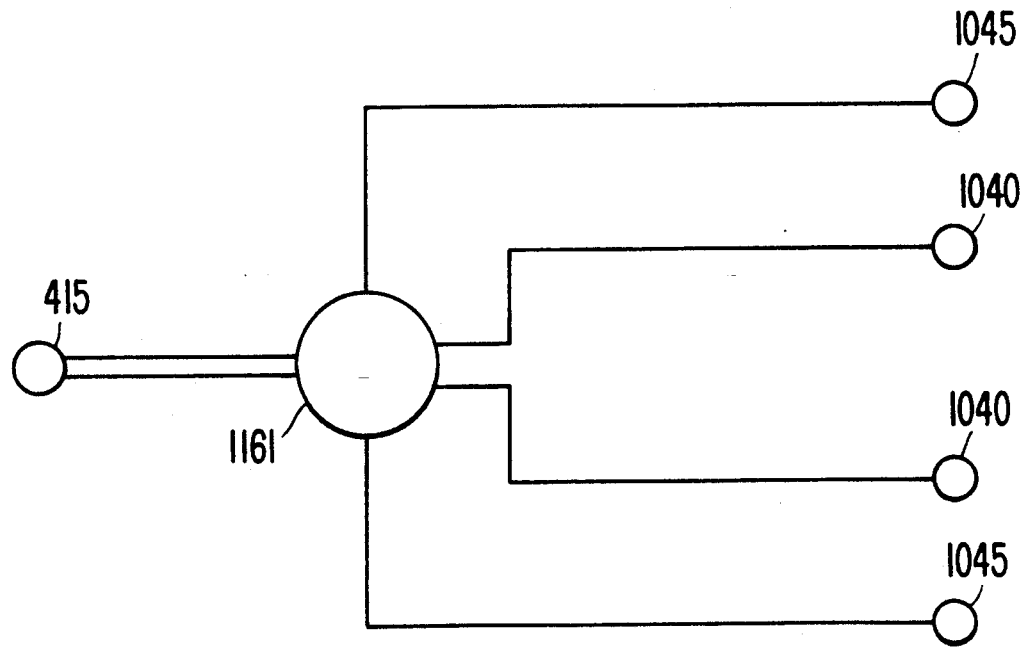
FIG. 11 is a flow diagram of the fluid power hydraulic system.

FIG. 11 is a flow diagram of the fluid power hydraulic system which includes 1161 power hydraulic pump, 415 hydraulic motor and gear drive, 1040 vacuum skimmer header rotating hydraulic cylinders and 1035 vacuum skimmer header positioning hydraulic cylinders.

Figure 12A:
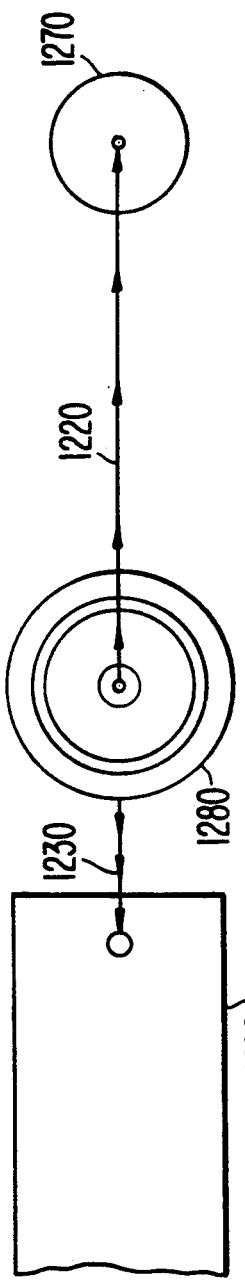
FIGS. 12A and 12B are flow diagrams of the vacuum receiver and primary Oil/Water separation column.
Figure 12B:
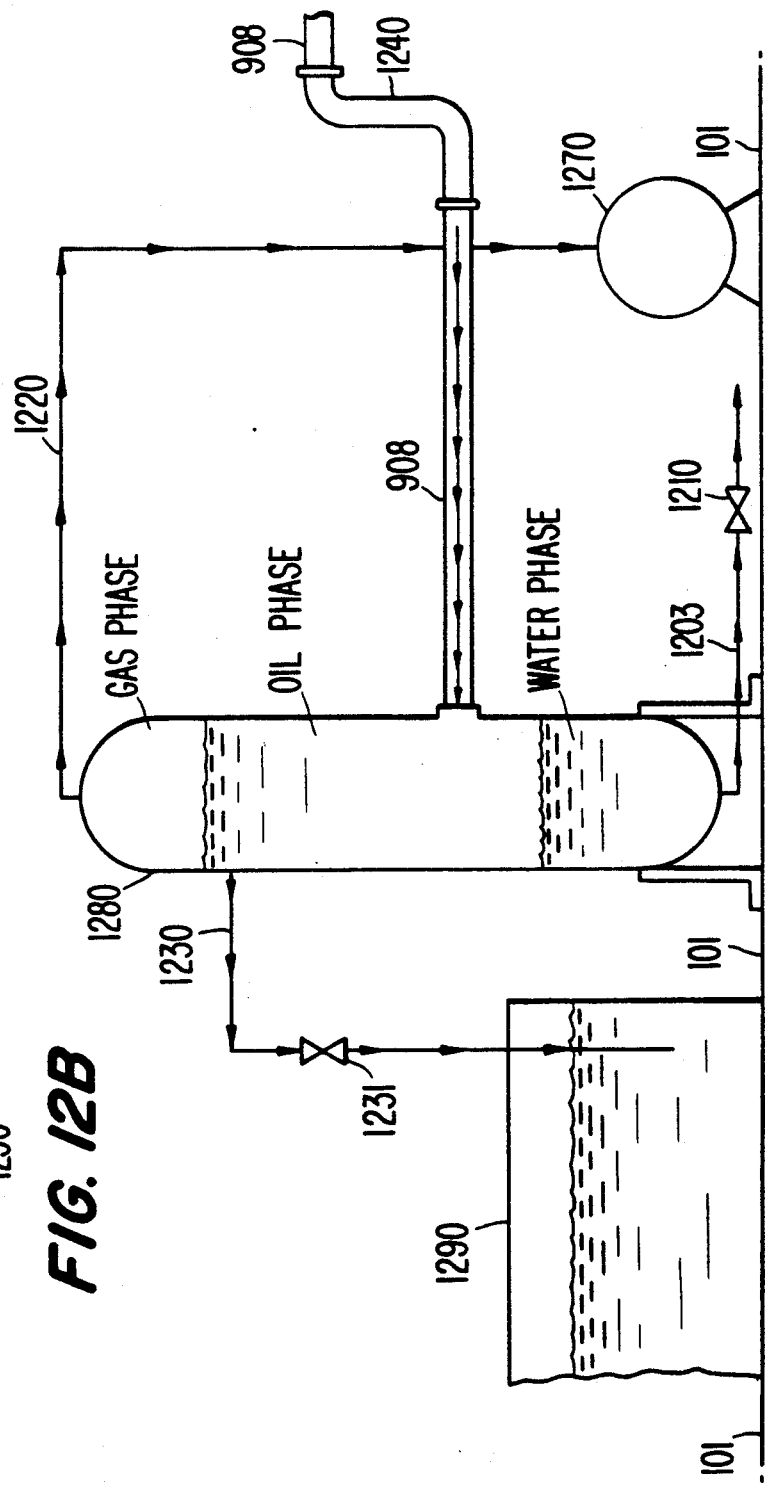

FIGS. 12A and 12B are flow diagrams of 1280 the vacuum receiver and primary Oil/Water separation tank which includes 101 barge hull, 908 rigid suction pipelines, 1203 vacuum receiver and primary separation column water recycle pipeline, 1210 flow control valve, 1220 vacuum pipeline from 1270 to 1280, 1230 gravity discharge line, 1231 check valve, 1240 flexible hose, and 1290 secondary gravity Oil/Water separation tank.

FIG. 13 A, B, C are flow diagrams of 1290 the secondary gravity Oil/Water separation tank which includes 1206 the secondary gravity Oil/Water separation tank recycle water pipeline, 1230 vacuum pipeline from 1280 to 1290, 1401 gravity transfer pipelines from 1290 to 1421 Oil storage tanks, 1404 gravity transfer pipelines from 1421 to 1290 and 1307 valves.

FIG. 14-A and 14-B are drawings of 1290 the secondary gravity Oil/Water separation tank which includes 101 barge hull, 1206 secondary gravity Oil/Water separation tank water recycle pipeline, 1230 vacuum pipeline from 1280 to 1290, 1280 vacuum receiver and primary separation column, 1307 valve, 1401 gravity transfer pipelines from 1290 to 1421, 1404 gravity transfer pipelines from 1421 to 1290, 1410 Oil transfer pump and 1420 valves.

The integration of the six process systems into an overall performance unit starts with the water supply to the 703 Vertical Centrifugal Pump. The water supply to the suction of the 703 Vertical Centrifugal Pump is provided from three different sources. For filling and also providing for water losses in the two recycle systems, the 708 Exterior Suction Line outside of the 101 Barge Hull is used. When the Oil Recovery Barge is in continuous operation, there are two sources of recycled water available to the 703 Vertical Centrifugal Pump. The first is from the 1203 Vacuum Receiver and Primary Separation Column Recycle Pipeline. The second is from the 1206 Secondary Gravity Oil/Water Separation Tank Water Recycle Pipeline.

The outflow of the 703 Vertical Centrifugal Pump is directed into the 701 Multistage Multiport Diffuser. The 701 Multistage Multiport Diffuser also receives Compressed Air from the 705 Air Compressor by way of the 704 Compressed Air Supply Pipeline. The internal pressure of the 701 Diffuser is caused by the 703 Vertical Centrifugal Pump and the 705 Air Compressor and is maintained at a pressure level in excess of 15 PSIG. By maintaining a pressure level in excess of 15 PSIG, the solubility of both the Nitrogen and Oxygen Gases in the compressed Air is increased above the levels possible at normal Atmospheric Pressure. The 701 Diffuser also provides fine bubble entrainment of the Compressed Air, provided by the 705 Air Compressor, that is greatly in excess of the solubility limits of the Oxygen and Nitrogen in the Compressed Air. As effective floation of Oil Droplets requires that the gas bubble be of a smaller size than the Oil Droplets, it is necessary to provide Gas Bubble sizes that vary in size from Micron size up to a maximum of approximately ¼ inch in diameter. The 701 Diffuser provides this range of bubble sizes by two different methods. The Microbubble sizes are produced by the release of pressure, which in turn, causes a loss in the solubility of both the Oxygen and Nitrogen in the Water carrier. The Oxygen and Nitrogen coming out of solution is in the form of bubbles in the Microbubble size range.

The entrained Air Bubble sizes produced by the 701 Diffuser result from three different actions within the body of the 701 Diffuser. The first is the introduction of the Compressed Air at the inlet of the 701 Diffuser in a manner that provides uniform distribution of the Gas into the Water and the turbulence caused by the impact of the opposing gas streams. Needed turbulence in the Water/Gas mixture is provided by the flow pattern of the baffle elements which cause a 90 degree change in the direction of flow over a very short distance. As the flow through the 701 Diffuser is basically in a horizontal direction, some separation of the entrained Air is caused by the large difference in the Specific Gravity between the Air and the Water. The third method of providing entrainment of the Air in the Water of the 701 Diffuser compensates for this Specific Gravity by injection of high pressure water into the top of the 701 Diffuser body at the point of flow impact in each stage. By the use of the higher pressure Water injection, vortexes are produced which re-inject the separated Air back into the Water in an entrained condition in each stage of the Diffuser.

The Water/Air mixtures from the 701 Diffuser is transported under pressure by the 605 Supply Pipelines to the 609 Oil Film Compaction Distribution Header. The 605 Supply Pipelines are designed to provide uniform flow of the Air/Water mixture across the full length of the 609 Oil Film Compaction Distribution Header.

The submergence of the 609 Oil Film Compaction Distribution Header is controlled by the 505 Wave Following Float for two reasons. The first reason is to compensate for wave action that would cause changes in the desired submergence of the 609 Oil Film Compaction Distribution Header. The second reason is to provide proper positioning of the 609 Oil Film Compaction Distribution Header below the Oil Droplet Blanket for efficient flotation. As both the type of Oil and the time that the Oil has been in contact with the Water effects the depth and density of the Oil Droplets, only proper positioning of the 609 Oil Film Compaction Distribution Header will provide efficient Oil recovery.

The collection of the floated compacted Oil from the surface of the Water utilizes a special type of wave following device, the 1001 Vacuum Skimmer Float. Mounted on the 1001 Vacuum Skimmer Float is the 1035 Vacuum Skimmer Header, which can be positioned in an up or down attitude or rotated to change the angle of attack in relation to the 1001 Vacuum Skimmer Float. This ability is provided by the 1045 Vacuum Skimmer Header Positioning Hydraulic Cylinders. Fluid hydraulic power is provided by 1161 Fluid Power Hydraulic Pump.

The vacuum supply to the 1035 Vacuum Skimmer Header is provided by the 1270 Vacuum Pump by way of the 1280 Vacuum Receiver and Primary Separation Column, the 908 Rigid Suction Pipelines and the 910 Flexible Suction Hoses. The Oil/Water mixture from the 1035 Vacuum Skimmer Header is discharged into the 1280 Vacuum Receiver and Primary Separation Column. On entering the 1280 Vacuum Receiver and Primary Separation Column, the Oil/Water mixture is separated by the difference in Specific Gravity, wiht the Oil moving to the top of the column and the Water to the bottom of the column. The Oil is removed from the top of the 1280 Vacuum Receiver and Primary Separation Column by a gravity discharge leg. This is the 1230 Gravity Leg Discharge Pipeline which, in turn, discharges into the 1290 Secondary Gravity Oil Water Separation Tank. The recycled Water is discharged from the bottom of the 1280 Vacuum Receiver and Primary Separation Column into the 708 Suction Pipeline of the Vertical Centrifugal Pump 703 by the 1203 Water Recycle Pipeline.

The 1290 Secondary Gravity Oil/Water Separator Tank provides a second stage gravity separation of the Oil/Water mixture, with the recycled Water from the Vee Bottom of the 1290 Secondary Gravity Oil/Water Separator Tank being discharged through the 1206 Water Recycle Pipeline into the 708 Suction Pipeline of the 703 Vertical Centrifugal Pump. The Oil flows over the top of the adjustable weir of the 1290 Secondary Gravity Oil Water Separator Tank into the Oil Storage of the 1290 Secondary Gravity Oil/Water Separation Tank. The recovered Oil can be transferred from the 1290 Secondary Gravity Oil/Water Separation Tank by two methods. Both gravity flow and pumped transfer can be made to on board Oil Storage Tanks 1421 by use of gravity transfer Pipelines 1401 and 1404. To obtain maximum on board storage capacity of the Oil Storage Tanks 1421, the 1410 Oil Transfer Pump can be used to fill the 1421 Oil Storage Tanks.

The 1410 Oil Transfer Pump can also be used to transfer Oil directly from the Oil Recovery Barge to an independent Oil Storage Barge by pipeline 1420. This recovered Oil could be from the 1290 Secondary Gravity Oil/Water Separator Tank or from the 1421 Oil Storage Tanks by way of the 1401 or 1404 Gravity Transfer Pipelines.

I claim:

1. A method for separating and recovering oil from a body of water, comprising:

forming entrained air bubbles in water;

releasing said water having entrained air bubbles therein into said body of water at a predetermined distance below a surface of said body of water;

allowing said air bubbles to attach to said oil and, based on differences in specific gravity, raise towards said surface of said body of water with said oil attached thereto; and generating a vacuum suction and collecting said oil and water at said surface of said body of water or at a position between said surface and said predetermined distance below said surface using said vacuum suction.

2. A method according to claim 1, further comprising:

delivering collected oil and water to middle section of a vertical separation column wherein said oil rests above said water by gravity due to the respective specific gravity of said oil and said water.

3. A method according to claim 2, further comprising:

delivering oil containing water from an upper section of said vertical separation column to a horizontal separator having a V-shaped bottom extending along the longitudinal axis thereof and an overflow weir at an opposite end thereof;

allowing said oil and water to flow from said one end of said horizontal separator to said opposite end;

collecting oil flowing over said overflow weir; and withdrawing water separated from said oil from the bottom of said horizontal separator at said opposite end.

4. An apparatus for separating and recovering oil from a body of water, comprising:

a support frame adapted to be connected to a floating vessel;

means for positioning a portion of said support frame a predetermined distance below the surface of said body of water;

means for providing water having entrained air bubbles therein fixed to said portion of said support frame;

collection means for collecting oil and water, said collection means being connected to said support frame at a position at said surface of said water or at a position between said surface and said predetermined distance below said surface.

5. An apparatus according to claim 4, further comprising a vertical separation column for separating oil and water collected by said collection means by gravity, said vertical separator column having an upper section and a lower section and a middle section between said upper section and said lower section and including an inlet operably connected to said collection means and located at said middle section, a first outlet for water or water containing oil at said lower section and a second outlet for oil or oil containing water at said upper section.

6. An apparatus according to claim 5, further comprising additional separator means for further separation of oil and water delivered from said second outlet of said vertical separation columns.

7. An apparatus according to claim 6, wherein said additional separator means comprises a longitudinally extending horizontal separator having a V-shaped bottom extending longitudinally therein, and inlet at an upstream end thereof, a vertical overflow weir an opposite downstream end thereof, an oil collection area downstream of said overflow weir and a water outlet at said bottom of said horizontal separator adjacent and upstream of said overflow weir.

8. An apparatus according to claim 4, wherein said means for providing water having entrained air bubbles therein comprises means for dissolving air in water under a pressure greater than one atmosphere and means for releasing water having air dissolved and entrained therein into said body of water.

9. A method according to claim 1, further comprising dissolving air into said water having entrained air bubbles therein by introducing said air into said water under a pressure greater than one atmosphere, and wherein upon said releasing of said water having entrained air bubbles therein into said body of water, micro-bubbles of air are formed in said body of water.

* * * * *